(12) United States Patent
Karl-Dietze et al.

(10) Patent No.: US 8,595,694 B2
(45) Date of Patent: Nov. 26, 2013

(54) SYSTEM AND METHOD FOR DEVELOPING SOFTWARE OR A SOFTWARE COMPONENT, AS WELL AS METHOD FOR OPERATING SAID SOFTWARE

(75) Inventors: Ludwig Karl-Dietze, Heroldsberg (DE); Klaus Rother, Schwalmtal (DE)

(73) Assignee: Siemens Aktiengesellschaft, München (DE)

( * ) Notice: Subject to any disclaimer, the term of this patent is extended or adjusted under 35 U.S.C. 154(b) by 1871 days.

(21) Appl. No.: 11/480,190

(22) Filed: Jun. 30, 2006

(65) Prior Publication Data
US 2007/0011688 A1 Jan. 11, 2007

(30) Foreign Application Priority Data
Jul. 5, 2005 (EP) .................................... 05014579

(51) Int. Cl.
*G06F 9/44* (2006.01)

(52) U.S. Cl.
USPC ........... 717/108; 717/106; 717/107; 717/110; 717/111

(58) Field of Classification Search
None
See application file for complete search history.

(56) References Cited

U.S. PATENT DOCUMENTS

| | | | | |
|---|---|---|---|---|
| 5,339,430 | A * | 8/1994 | Lundin et al. | 719/332 |
| 5,748,963 | A * | 5/1998 | Orr | 717/131 |
| 6,351,843 | B1 * | 2/2002 | Berkley et al. | 717/128 |
| 6,745,389 | B1 * | 6/2004 | Hostyn et al. | 719/315 |
| 6,857,119 | B1 * | 2/2005 | Desai | 717/145 |
| 7,788,662 | B2 * | 8/2010 | Haselden et al. | 717/170 |

FOREIGN PATENT DOCUMENTS

| | | |
|---|---|---|
| EP | 1 505 493 A2 | 2/2005 |
| WO | WO 01/54061 A2 | 7/2001 |

OTHER PUBLICATIONS

James Rumbaugh, Michael Blaha, William Premerlani, Frederick Eddy, William Lorensen, "Objektorientiertes Modellieren und Entwerfen", 1993, pp. 71-75, 299-301, 379-385 and 431-434, Prentice-Hall, Inc., ISBN 3-446-17520-2.

Gustaf Neumann, Uew Zdun; "XOTcl—Tutorial (version 1.3.6)", Mar. 17, 2005, pp. I, 1-62, XP002356986.

Franz J. Hauck; "Typisierte Vererbund modelliert durch Aggregation (Typed transmission models aggregation)", Technical Report TR-14-9-93, Sep. 1993, pp. I-II, 1-12, XP002356987.

* cited by examiner

*Primary Examiner* — Van Nguyen
*Assistant Examiner* — Mark Gooray

(57) ABSTRACT

To make functional expansions of business objects possible in a simple manner, it is proposed that one or more function units is assigned to the business object during the creation of the business object or after its creation, using meta knowledge. A function unit can thus be assigned to a business object even during the run time of the software. A design template for software architecture is thus created which makes it possible to resolve software problems in a particularly simple and elegant manner.

6 Claims, 2 Drawing Sheets

SYSTEM AND METHOD FOR DEVELOPING SOFTWARE OR A SOFTWARE COMPONENT, AS WELL AS METHOD FOR OPERATING SAID SOFTWARE

CROSS REFERENCE TO RELATED APPLICATIONS

This application claims the benefits of European Patent application No. 05014579.6 filed Jul. 5, 2005 and is incorporated by reference herein in its entirety.

FIELD OF THE INVENTION

The present invention relates to a system for developing software or a software component, a method for developing a software component and also a method for operation of software which was developed in accordance with such a method or which features a software component developed in accordance with such a method.

BACKGROUND OF THE INVENTION the definition of "objects" is known in software development, with said objects, as self-contained units, feature both data and also instructions for handling the data. Such objects, which are created using what are known as object-oriented programming languages, can, as so-called business objects, map a part of a real business concept. Thus the business objects "integrated housing" or "power supply module" could be created, for mapping a section of an automation project for example. In other words a business object is an object which handles services for the overall application. Business objects in such cases always included a part of the business logic. As well as business objects, other known objects include data objects and interface objects which are accordingly used for the administration of data and data linkage or for operating interfaces and such like.

An advantage of this object-oriented programming is that new objects can be created which inherit the properties of objects already present. In other words a specialization of a business object can be achieved through this inheritance concept. The result of this is that functional expansions which are undertaken after a software version is delivered are only possible with business objects which are supplied with a successor version, or—if base classes of the business object are involved—a new version of all business objects derived from this base class is required.

This restriction makes it difficult to supply individual business objects at a later stage, since, as a result of dependencies, this often involves those business objects which have already been supplied. If the software product concerned involves an open system, into which business objects of third-party manufacturers can be linked, expansions to existing business objects frequently lead to the third-part suppliers also having to create and make available a new version of the business objects which they have created. The costs incurred in such cases lead to the software product becoming more expensive as well as to additional effort being needed for software development and system testing.

SUMMARY OF THE INVENTION

One object of the present invention is to make functional expansions of business objects possible in a simple manner. This object is achieved by methods in accordance with the claims and a system in accordance with the claims.

For the development of software or of a software component there is thus provision in accordance with the invention for one or more function objects to be assigned to the business object during the creation of a business object or after its creation, using meta knowledge.

A design template for a software architecture is created with the present invention which allows software problems to be resolved in an especially simple and elegant way.

Since the desired business functionalities are not contained in the business object itself but in function units independent of the business object, so-called "features", these types of functionalities can be assigned to a business object in any given manner. Instead of derivation or inheritance—as known from the prior art—an aggregation of function units is thus undertaken. Business objects can thus be expanded by insertion of function units without the base classes or other business objects already supplied having to be modified.

The assignment of the function units to the various business objects is undertaken in this case using meta knowledge, which is preferably present in text form, for example as XML-based meta knowledge in one or more description files, or dynamically at run time.

For the execution of this type of program software of software components on a computer an assignment of a function unit to a business object during the run time of the software is thus possible in a simple manner. This merely requires the corresponding function unit to be allocated to the business object using correspondingly modified meta knowledge which is accessed by a factory object for example.

Expressed in another way, any number of function blocks can be "added into" a business object, in a similar way as building blocks in a Lego set, with different business objects being able to be modeled by different combinations of the same function blocks.

The invention achieves the object of very largely decoupling the individual parts of the business logic from each other. When a change is made to the software only a very small part of the software thus has to be changed, tested and supplied.

Whereas the software products known from the prior art are produced after the compilation of an executable product which can no longer be changed, it is possible with the aid of the invention to use business objects which can even be expanded with function units during the run time of the software and thereby modified.

In other words it is possible, using newly inserted meta knowledge, to notify a business object which is running that a new function unit is to be started and thereby inserted.

This makes possible both a functional expansion of business objects already supplied, and also of those business objects which were implemented by third parties. To put it another way, new function units can also be linked to the business objects by third-party suppliers with the aid of the meta knowledge. This is also especially possible because of the independence of the function units from each other, since for the aggregation of a new function unit the function units from the third-party supplier needed for their own business functionality do not have to be taken into account.

Advantageous embodiments of the invention are specified in the subclaims.

In accordance with a preferred embodiment of the invention the function units each implement separate functions of the business logic. This type of independence of the function units from each other means that they can also be replaced by new versions individually or separately from each other. The independence of the function units supports the parallel development of the software and reduces the effort involved in system testing since the testing can be restricted to changed function units. Should function units be designed such that they interact with each other, they can also be exchanged or supplied later in pairs if the interfaces or semantics of these function units have changed.

Independence of the function units from each other also means that a function unit preferably only comprises those components of the business logic which do not fall within the area of responsibility of other function units. Preferably the business logic to be implemented is subdivided into small functional units so that the function units "equipped" with these functional units are actually independent of each other. In order to merge the business logic as a whole back together again the function units are assigned the business object in the appropriate combination.

In accordance with the specifications of the software to be created, regulations exist stating when a relationship is to be established between particular business objects. Since the business objects concerned always involve the same object type, in other words the business objects only differ from each other on the basis of the aggregated function units, an all-encompassing rule covering when a relationship between two objects should always be established if these two objects encounter each other is not sensible. In accordance with a further preferred embodiment of the invention, the definition and/or administration of the relationships between business objects is assigned to the function units. A business object model established in this way allows a flexible administration of relationships appropriate to the new structure of the business object.

BRIEF DESCRIPTION OF THE DRAWINGS

The invention is explained below on the basis of an exemplary embodiment which is described in greater detail with the aid of the Figures. The Figures show.

DETAILED DESCRIPTION OF THE INVENTION

Figure 1:
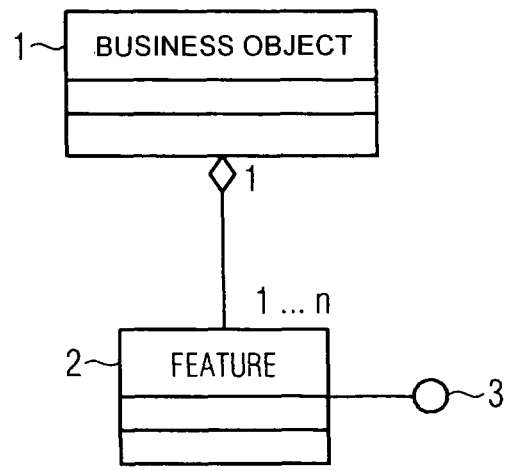
FIG. 1 a schematic diagram of a general object model in accordance with the invention, FIG. 2 a schematic diagram of two business objects linked to each other based on an entity model, FIG. 3 a schematic diagram of the creation of two business objects.

As specified in FIG. 1 in the form of a schematic diagram of a general object model, a number (1 through n) of function units 2 is assigned to a business object 2. The function unit 2 implements an interface 3 with selected functions. These interface functions are offered to the user of the business object 1 by the function unit 2.

Figure 2:
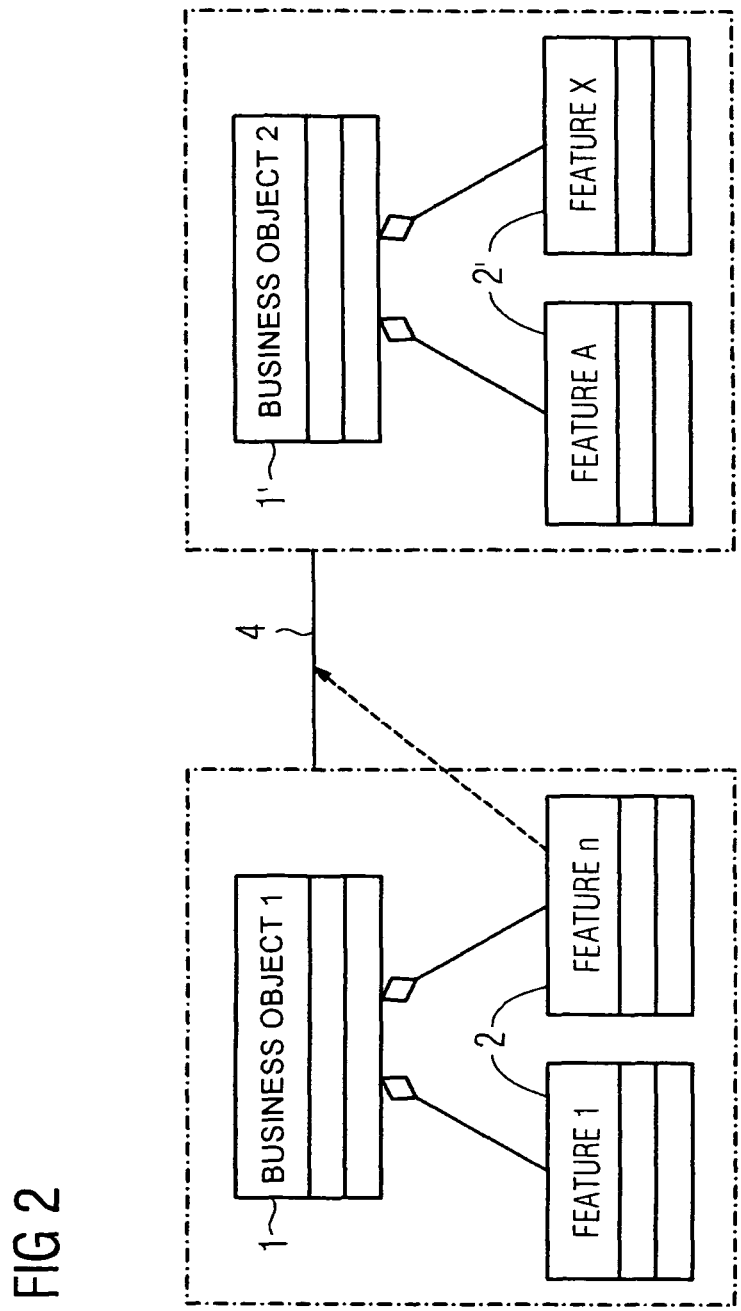

FIG. 2 shows a typical schematic diagram of two business objects 1, 1', linked to each other on the basis of an entity model. The two business objects 1, 1' are of the same object type. They thus differ exclusively through the function units 2 bound into them. The function units "1" to "n" are aggregated to the first business object 1 and the function units "A" to "X" are aggregated to the second business object 1'. The function unit "n" of the first business object 1 establishes the relationship between the two business objects 1, 1' as a relationship 4 and administers this relationship.

Figure 3:
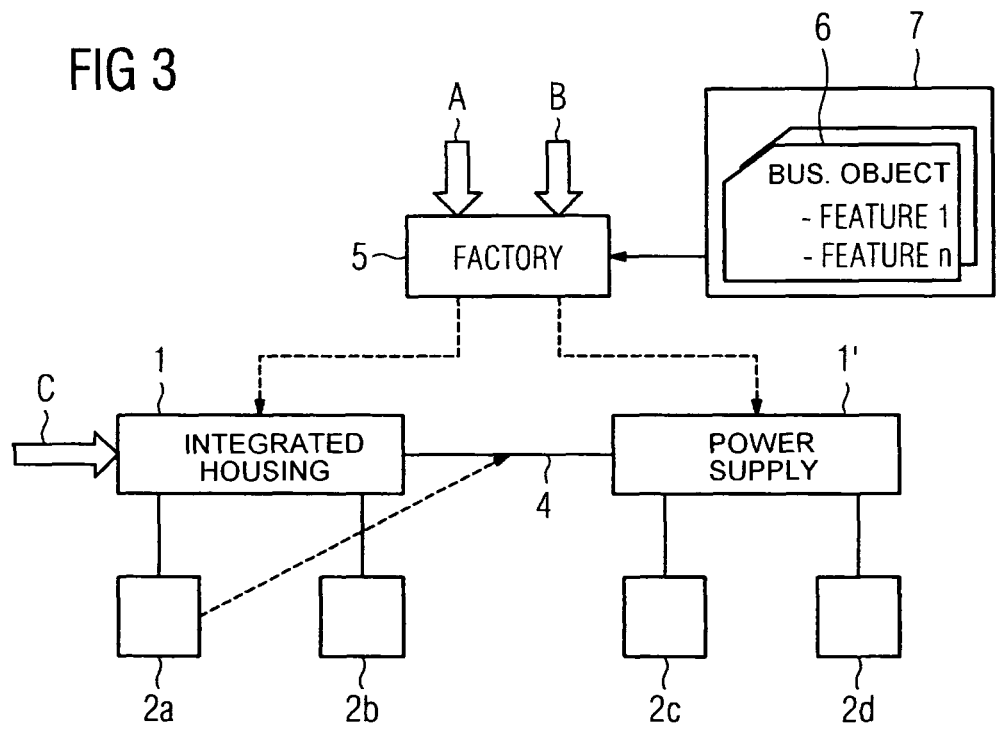

An extract of a development of software or software components with a development system as used in a software development environment is shown as an example in FIG. 3.

The development system involved is a computer on which software engineering software is executed which maps the inventive features in software. In other words the invention is implemented as part of this software engineering software.

For creating or administering two businesses objects "integrated housing" 1 and "power supply module" 1' a factory object ("factory") 5 is used. The factory object 5 requires a specific knowledge to be able to create business objects or to know about the different relationships between the business objects 1, 1' respectively. This knowledge is stored as meta knowledge 6 in a description file 7. In other words the structure of the business objects 1, 1' is described in the meta knowledge. The meta knowledge 6 is stored in the description file 7 in XML format, so that it can also be modified in an automated manner.

The factory object 5 serves as a programming framework which undertakes the interpretation of the meta knowledge 6. By having the meta knowledge 6, the factory object 5 thus knows about facts such as which function units 2 are assigned by default to which business objects 1.

The factory object 5 receives from the software engineering software the order to create a business object "integrated housing" 1 (arrow A). The factory object 5 then determines from the meta knowledge 6 provided in the description file 7 the function units to be created for the business object "integrated housing" 1 and creates the business object "integrated housing" 1 with these function units. The function units involved are the function unit "slots" 2a and the function unit "bus" 2b.

In a further step the factory object 5 receives from the software engineering software the order to create the business object "power supply module" 1' (arrow B). The factory object 5 determines from the meta knowledge 6 the function units to be created, namely in this case the function units "power supply module" 2c and also "bus connection" 2d, and creates the business object "power supply module" 1' with these function units.

Orders for the business objects 1 are distributed to the function units 2 and executed. Thus in a further step, a business object 1' "integrated housing" for example receives the order from the software engineering software (arrow C), to link the business object "power supply module" 1' with the business object "integrated housing" 1 via a relationship 4. This order is forwarded to the function unit "slots" 2a of the business object "integrated housing" 1. The function unit "slots" 2a then it establishes the relationship 4 to business object "power supply module".

In summary it is thus proposed, especially in a simple manner, to make possible expansions of business objects, in that during the creation or after the creation of a business object 1, an assignment of one or more function units 2 to a business object 1 is undertaken using meta knowledge 1. A function unit 2 can thus also be assigned to a business object 1 during the run time of the software. A design template for software architecture is thus created which makes it possible to resolve software problems in a particularly simple and elegant manner.

The invention claimed is:

1. A computer system for developing an object-oriented software computer program or software component comprising business objects, the computer system comprising a computer on which a software engineering program is executed that performs the following steps:

receiving by a factory object, an order to create one or more business objects;

defining in a separate description file the structure of the one or more business objects to determine which of a plurality of function units are to be assigned to a corresponding business object;

providing the plurality of function units that are independent from each other and contain certain functions of business logic for implementation;

interpreting, by the factory object, meta knowledge from the separate description file in accordance with the order to create the one or more business objects;

creating, by the factory object, business objects during runtime, without using inheritance or derivation from a base class or from another object, by:
  (a) assigning to the first business object one or more function units in accordance with the description file, such that function units are aggregated and bound to the first business object but remain independent from the first business object;
  (b) assigning to one or more further business objects one or more function units in accordance with the description file, such that function units are aggregated and bound to the one or more further business objects but remain independent from the one or more further business objects;

administering relationships between business objects by receiving and forwarding, by the business object created, a link order for one of the function units assigned to the business object created to establish a relationship between the business object created and the one or more further business objects created in accordance with the description file;

expanding one or more business objects during runtime by the factory object by the addition of one or more further function units to the one or more business objects in accordance with change meta knowledge in the separate description file used to notify a corresponding business object which is running that a new function is to be inserter;

wherein through the assignments of function units to the business object created, the business objects created differ exclusively through the function units assigned to them.

2. A computer-implemented method for developing and expanding an business object in a software program comprising business during runtime, the method executed on a computer, the method comprising:

receiving by a factory object, an order to create one or more business objects;

defining in a separate description file the structure of the one or more business objects to determine which of a plurality of function units are to be assigned to a corresponding business object;

providing the plurality of function units that are independent from each other and contain certain functions of business logic for implementation;

interpreting, by the factory object, meta knowledge from the separate description file in accordance with the order to create the one or more business objects;

creating, by the factory object, business objects during runtime, without using inheritance or derivation from a base class or from another object, by:
  (a) assigning to the first business object one or more function units in accordance with the description file, such that function units are aggregated and bound to the first business object but remain independent from the first business object;
  (b) assigning to one or more further business objects one or more function units in accordance with the description file, such that function units are aggregated and bound to the one or more further business objects but remain independent from the one or more further business objects;

administering relationships between business objects by receiving and forwarding, by the business object created, a link order for one of the function units assigned to the business object created to establish a relationship between the business object created and the one or more further business objects created in accordance with the description file;

expanding one or more business objects during runtime by the factory object by the addition of one or more further function units to the one or more business objects in accordance with change meta knowledge in the separate description file used to notify a corresponding business object which is running that a new function is to be inserter;

wherein through the assignments of function units to the business object created, the business objects created differ exclusively through the function units assigned to them.

3. The method in accordance with claim 2, wherein the change of meta knowledge occurs during the runtime.

4. The method in accordance with claim 3, wherein the change of the meta knowledge in the description file is an expansion to provide additional functionalities.

5. The method in accordance with claim 4, wherein the relationship between the first business objects and the one or more further business objects is dynamically managed by the function unit.

6. The method in accordance with claim 5, wherein additional function units are added to the first business object during the runtime without requiring modification of the one or more further business objects during the run time.

* * * * *